(12) United States Patent
Chindapol et al.

(10) Patent No.: US 9,609,576 B1
(45) Date of Patent: Mar. 28, 2017

(54) METHOD OF REDUCING ACTIVE CELLULAR CONNECTIONS IN A WIRELESS NETWORK

(71) Applicant: Sprint Spectrum LP, Overland Park, KS (US)

(72) Inventors: Aik Chindapol, Washington, DC (US); Gila Ghavami, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/064,714

(22) Filed: Mar. 9, 2016

Related U.S. Application Data

(63) Continuation of application No. 14/014,248, filed on Aug. 29, 2013, now Pat. No. 9,319,940.

(51) Int. Cl.
*H04W 48/02* (2009.01)
*H04W 72/04* (2009.01)
*H04W 36/32* (2009.01)
*H04W 36/00* (2009.01)

(52) U.S. Cl.
CPC ........ *H04W 48/02* (2013.01); *H04W 36/0055* (2013.01); *H04W 36/32* (2013.01); *H04W 72/04* (2013.01)

(58) Field of Classification Search
CPC ..... H04W 36/22; H04W 36/14; H04W 16/08; H04W 84/18; H04W 84/20; H04W 84/22
See application file for complete search history.

(56) References Cited

U.S. PATENT DOCUMENTS

| 7,551,577 | B2 | 6/2009 | McRae |
|---|---|---|---|
| 2007/0160016 | A1 | 7/2007 | Jain |
| 2008/0113674 | A1 | 5/2008 | Baig |
| 2011/0167478 | A1 | 7/2011 | Krishnaswamy et al. |
| 2011/0170466 | A1 | 7/2011 | Kwun |
| 2011/0222428 | A1 | 9/2011 | Charbit et al. |
| 2011/0294502 | A1 | 12/2011 | Oerton |
| 2012/0142328 | A1 | 6/2012 | Awoniyi et al. |
| 2012/0307722 | A1 | 12/2012 | Thach |
| 2013/0088983 | A1 | 4/2013 | Pragada et al. |
| 2013/0215860 | A1* | 8/2013 | Cho ........ H04B 7/026 370/329 |
| 2013/0301438 | A1* | 11/2013 | Li ........ H04W 76/048 370/252 |

(Continued)

OTHER PUBLICATIONS

International Search Report for PCT/US2014/052662 dated Jan. 14, 2015.

*Primary Examiner* — Robert M Morlan

(57) ABSTRACT

A system and method of providing wireless communications to a wireless device is provided. A scanning report can be received from each of a plurality of wireless devices in communication with a first access node using a first radio access technology. A second access node can be selected from among one or more second access nodes to initiate communications with the first access node over a communication link based on the scanning report from each of the plurality of wireless devices. The plurality of wireless devices can be instructed to establish communications with the second access node using a second radio access technology different from the first radio access technology. A bandwidth allocation of the communication link can be adjusted based on the plurality of wireless devices.

17 Claims, 6 Drawing Sheets

(56) References Cited

U.S. PATENT DOCUMENTS

| | | | |
|---|---|---|---|
| 2014/0071870 A1* | 3/2014 | Abraham | H04W 52/0206 370/311 |
| 2014/0079022 A1 | 3/2014 | Wang et al. | |
| 2014/0080533 A1* | 3/2014 | Tabrizi | H04W 72/08 455/513 |
| 2014/0082697 A1* | 3/2014 | Watfa | H04W 76/025 726/3 |

* cited by examiner

METHOD OF REDUCING ACTIVE CELLULAR CONNECTIONS IN A WIRELESS NETWORK

TECHNICAL BACKGROUND

Wireless communication networks implement various methods of maintaining a communication link with a wireless device. Network infrastructure can be used to support a high number of simultaneous cellular communication links with wireless devices. However, network infrastructure hardware has limitations that can easily be exceeded as the number of wireless devices running applications in constant communication with the network increases. When the network reaches active link thresholds, service interruptions can occur causing an undesirable user experience.

Some solutions to expand the network capacity include deploying more carriers to increase spectrum use, purchasing additional hardware to install within the existing network, or expanding the network by building new infrastructure sites. All of these options have significant costs associated with implementation. In addition, network expansions typically require several months to years to complete.

OVERVIEW

Systems and methods of providing wireless communications to a wireless device are provided. A scanning report can be received from each of a plurality of wireless devices in communication with a first access node using a first radio access technology. A second access node can be selected from among one or more second access nodes to initiate communications with the first access node over a communication link based on the scanning report from each of the plurality of wireless devices. The plurality of wireless devices can be instructed to establish communications with the second access node using a second radio access technology different from the first radio access technology. A bandwidth allocation of the communication link can be adjusted based on the plurality of wireless devices.

DETAILED DESCRIPTION

Figure 1:
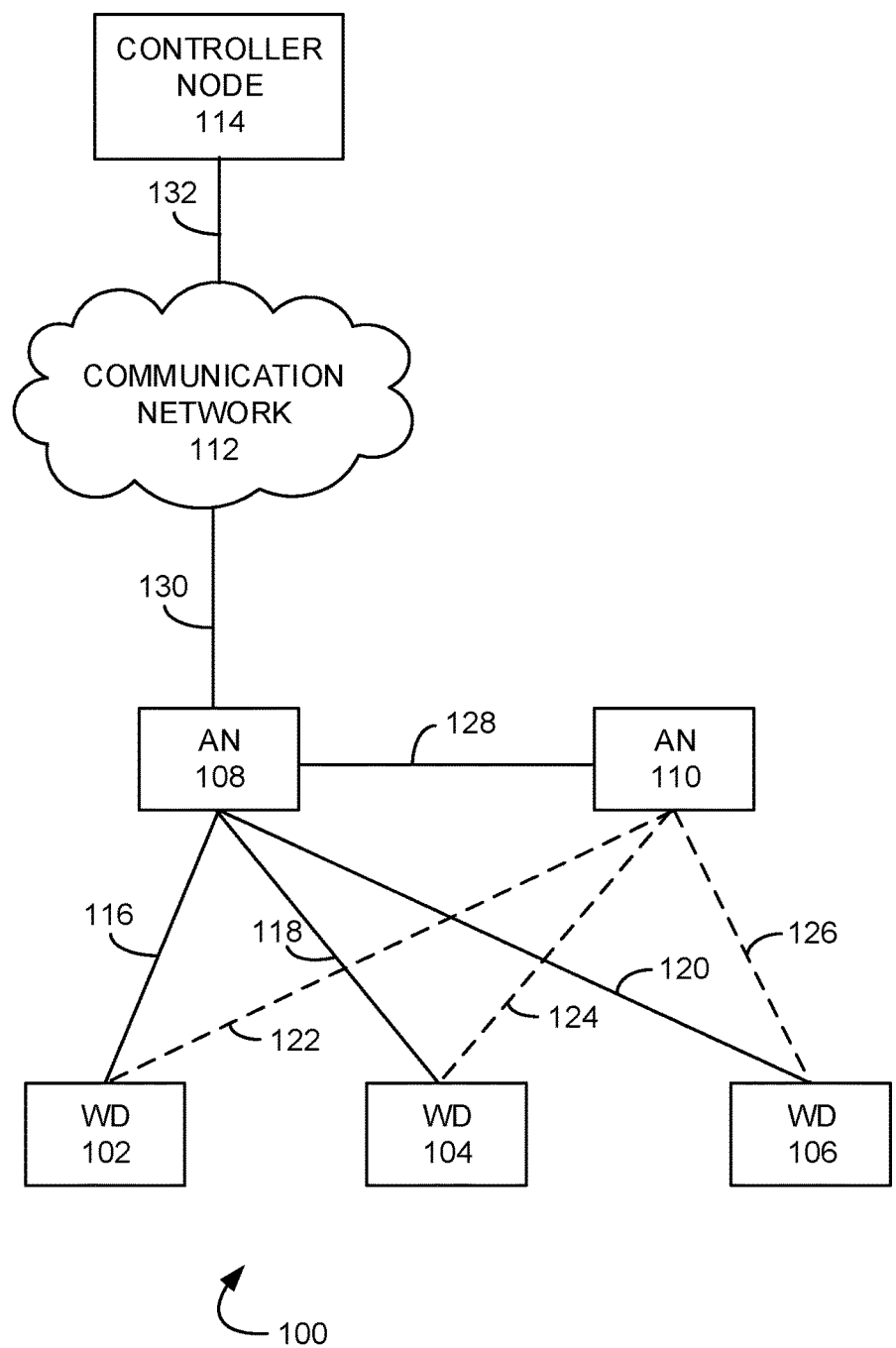
FIG. 1 illustrates an exemplary communication system to provide wireless communication to a wireless device.

FIG. 1 illustrates an exemplary communication system 100 for providing wireless communications to a wireless device. Communication system 100 can comprise wireless devices 102, 104, and 106, an access node 108 of a first radio access technology, an access node 110 of a second radio access technology, a communication network 112, and a controller node 114. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 108, 110 and communication network 112 which are omitted for clarity, including additional processing nodes, routers, gateways, and physical and/or wireless data links for carrying data among the various network elements.

Wireless devices 102, 104, 106 can be any device configured to communicate over communication system 100 using a wireless interface. For example, wireless devices 102, 104, 106 can include a cell phone, a smart phone, a computing platform such as a laptop, palmtop, or a tablet, a personal digital assistant, or an internet access device, and combinations thereof. The wireless interface can include a plurality of transceivers, where each transceiver is associated with a different radio access technology. For instance, wireless devices 102, 104, 106 can include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and at least one transceiver associated with a local or short-range wireless protocol such as IEEE 802.11, wireless fidelity (WiFi), Bluetooth, Zigbee, infrared data association (IrDA), etc. It is noted that while three wireless devices are illustrated in FIG. 1 as being in communication with access nodes 108 and/or 110, any number of wireless devices can be implemented.

Wireless devices 102, 104, 106 can communicate with access node 108 through communication links associated with a first radio access technology 116, 118, 120. Wireless devices 102, 104, 106 can also communicate with access node 110 through communication links associated with a second radio access technology 122, 124, 126. Links 116, 118, 120, 122, 124, 126 can use various communication media, such as air, space, metal, optical fiber, or some other signal propagation path—including combinations thereof. Communication links 116, 118, 120, 122, 124, 126 can comprise many different signals sharing the same link. Communication links 116, 118, 120, 122, 124, 126 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 102, 104, 106 and access node 108 could share the same representative wireless links 116, 118, 120, but be transferred over different communication sessions, frequencies, timeslots, packets, ports, sockets, logical transport links, or in different directions—including combinations thereof.

Access node 108 can be any network node configured to communicate with wireless devices 102, 104, 106 and communication network 112. Access node 110 can be any network node configured to communicate with wireless devices 102, 104, 106 and access node 108. While not illustrated in FIG. 1, access node 110 could also be in communication with communication network 112 in addition to being in communication with access node 108. Access nodes 108, 110 can be capable of providing wireless communications to wireless devices 102, 104, 106. For example, access nodes 108, 110 can be selected from a base transceiver station, a radio base station, an eNodeB device, or an enhanced eNodeB device.

Access node 108 can be associated with a first radio access technology and access node 110 can be associated with a second radio access technology different from the first radio access technology. For example, access node 108 can be associated with a wireless cellular protocol such as CDMA, GSM, WiMAX, LTE, and HSDPA and access node 110 can be associated with a local or short-range wireless protocol such as IEEE 802.11, WiFi, Bluetooth, Zigbee, and IrDA. Access node 110 can be a stand-alone device or it can be a multi-mode device where modes can include a cellular protocol and a local wireless protocol. For instance, when access node 110 is a wireless device having multi-mode functionality such that the wireless device can be enabled in a mobile hot spot such that the wireless device can communicate with wireless devices 102, 104, 106 using a local wireless protocol. In addition, access node 110 can communicate with access node 108 over communication link 128 using a different protocol such as a wireless cellular protocol.

Access nodes 108, 110 can comprise a processor and associated circuitry to execute or direct the execution of computer-readable instructions to obtain information. Access nodes 108, 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 108, 110 can receive instructions and other input at a user interface.

Access node 108 can be in communication with communication network 112 through communication link 130. Access node 110 can be in communication with access node 108 through communication link 128. Communication links 128, 130 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 128, 130 can be a direct link or might include various equipment, intermediate components, systems, and networks. Links 128, 130 can include multiple signals operating in a single pathway in a similar manner as wireless links 116, 118, 120, 122, 124, 126.

Communication network 112 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 112 can be capable of carrying data, for example, to support voice and data communications by a wireless device such as wireless devices 102, 104, 106. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 112 can also comprise additional base stations, controller nodes, telephony switches, internet routers, network gateways, computer systems, communication links, or some other type of communication equipment, and combinations thereof.

Controller node 114 can be any element configured to communicate information over a network or to control communication of the information over the network. Controller node 114 can be in communication with communication network 112 through communication link 132. Controller node 114 can be a standalone computing device, computing system, or network component, and can be accessible, for example, by a wired or wireless connection, or through an indirect connection such as through a computer network or communication network. For example, controller node 114 can include a mobility management entity (MME), a serving gateway (SGW), a public data network gateway (PGW), a Home Subscriber Server (HSS), a Policy Control and Charging Rules Function (PCRF), an Authentication, Authorization, and Accounting node (AAA), etc.

Controller node 114 can comprise a processor and associated circuitry to execute or direct the execution of computer-readable instructions to obtain information. Controller node 114 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 114 can receive instructions and other input at a user interface.

In operation, wireless devices 102, 104, 106 can establish communication links 116, 118, 120 with access node 108 using a first radio access technology, such as a cellular protocol. While wireless devices 102, 104, 106 are in active communication with access node 108, each wireless device 102, 104, 106 can monitor for access nodes capable of communicating using a second radio access technology such as a short-range wireless protocol. Each wireless device 102, 104, 106 can then send a status report to the controller node 114 through the active link 116, 118, 120 with access node 108. The status report can include a list of all access nodes capable of communicating using the second radio access technology. The controller node 114 can identify access node devices capable of communicating using the second radio access technology within a predetermined geographic location and compile a list of the access nodes capable of communicating using the second radio access technology common to a plurality of wireless devices 102, 104, 106. The controller node 114 can select an access node from the list of access nodes capable of communicating using the second radio access technology common to the wireless devices 102, 104, 106. The access node can already be enabled to communicate using the second radio access technology or the controller node 114 can send a message to the access node to instruct the access node to enable a radio transceiver associated with the second radio access technology to begin actively communicating using the second radio access technology. Once the access node capable of communicating using the second radio access technology is enabled, the wireless devices 102, 104, 106 can establish connections with access node 110 using the second radio access technology. The bandwidth allocation of the communication link between access node 108 and access node 110 can be adjusted based on various factors such as Quality of Service (QoS) factors. For example, service and priority requirements as well as device requirements associated with each of the wireless devices 102, 104, 106.

Figure 2:
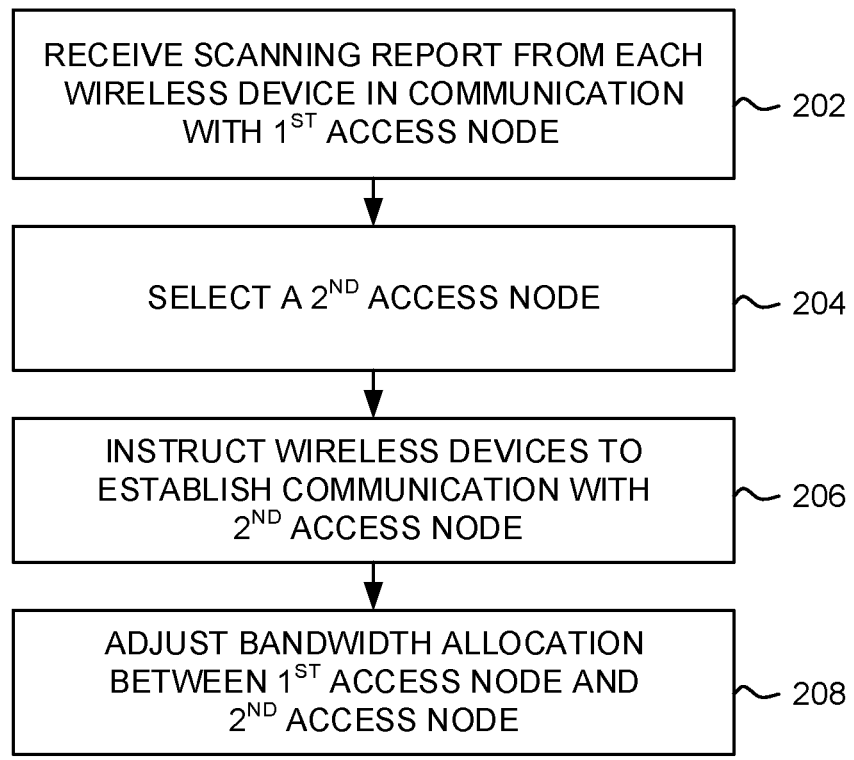
FIG. 2 illustrates an exemplary method of providing wireless communication to a wireless device.

FIG. 2 illustrates a flow chart of an exemplary method for providing wireless communication to a wireless device. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A controller node can receive a scanning report from each wireless device in communication with a first access node at 202. For example, wireless devices 102, 104, 106 can establish communication links 116, 118, 120 with access node 108 using a first radio access technology, such as a cellular protocol. While in communication with access node 108, wireless devices 102, 104, 106 can monitor for access nodes capable of communicating using a second radio access technology, such as a short-range wireless protocol. Each wireless device 102, 104, 106 can generate a scanning report including a list of the access nodes capable of communicating using the second radio access technology, where the scanning report is sent to controller node 114 through communication network 112.

A second access node capable of communicating using the second radio access technology can be selected from the plurality of scanning reports received from the wireless devices 102, 104, 106 at 204. The second access node can be selected based on various factors such as geographic location, communication link criteria and device requirements of each of the wireless devices 102, 104, 106. In an embodiment, a controller node 112 can select a second access node from a plurality of second access nodes, where the selected second access node common to all of the wireless devices 102, 104, 106.

The controller node can instruct wireless devices in communication with a first access node to establish communication with the selected second access node at 206. Controller node 114 can send a message to wireless devices 102, 104, 106 to establish communication links 122, 124, 126 with access node 110 using a second radio access technology such as a local or short-range wireless protocol. Access node can already be communicating using the second radio access technology or controller node 114 can send a message to access node 110 to enable the second radio access technology transceiver within the access node before instructing the wireless devices 102, 104, 106 to establish communication links 122, 124, 126. In an embodiment, controller node 114 can further instruct wireless devices 102, 104, 106 to end the active communication session with access node 108.

Bandwidth allocation of a communication link between a first access node associated with a first radio access technology and the selected second access node associated with a second radio access technology can be adjusted at 208. Controller node 114 can adjust the bandwidth allocation between the first access node and the second access node based on various factors such as the number of wireless devices in communication with access node 110, a type and/or number of applications running on each wireless device 102, 104, 106, network service requirements, etc. Communications between the first access node and the second access node can be made over link 128 using the first radio access technology. Total bandwidth allocation between the first access node 108 and the second access node 110 can be a sum of the bandwidth requirements for each wireless device 102, 104, 106.

Figure 3:
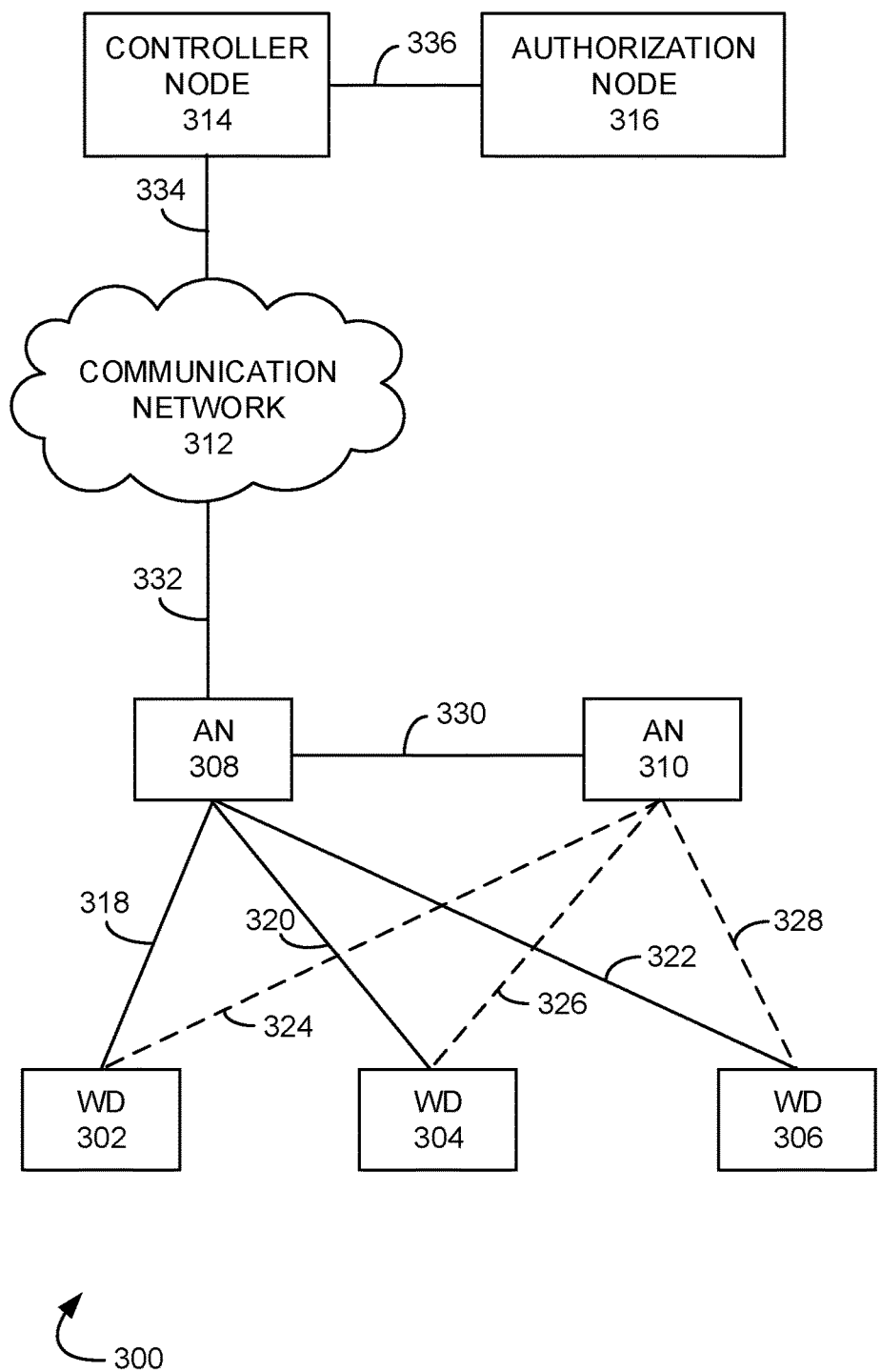
FIG. 3 illustrates another exemplary communication system to provide wireless communication to a wireless device.

FIG. 3 illustrates an exemplary communication system 300 for providing wireless communications to a wireless device. Communication system 300 can comprise wireless devices 302, 304, 306, an access node 308 of a first radio access technology, an access node 310 of a second radio access technology, a communication network 312, a controller node 314, and an authorization node 316. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 308, 310 and communication network 312 which are omitted for clarity, including additional processing nodes, routers, gateways, and physical and/or wireless data links for carrying data among the various network elements.

Wireless devices 302, 304, 306 can be any device configured to communicate over communication system 300 using a wireless interface. For example, wireless devices 302, 304, 306 can include a cell phone, a smart phone, a computing platform such as a laptop, palmtop, or a tablet, a personal digital assistant, or an internet access device, and combinations thereof. The wireless interface can include a plurality of transceivers, where each transceiver is associated with a different radio access technology. For instance, wireless devices 302, 304, 306 can include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and at least one transceiver associated with a local or short-range wireless protocol such as IEEE 802.11, wireless fidelity (WiFi), Bluetooth, Zigbee, infrared data association (IrDA), etc. It is noted that while three wireless devices are illustrated in FIG. 3 as being in communication with access nodes 308 and/or 310, any number of wireless devices can be implemented.

Wireless devices 302, 304, 306 can communicate with access node 308 through communication links associated with a first radio access technology 318, 320, 322. Wireless devices 302, 304, 306 can also communicate with access node 310 through communication links associated with a second radio access technology 324, 326, 328. Links 318, 320, 322, 324, 326, 328 can use various communication media, such as air, space, metal, optical fiber, or some other signal propagation path—including combinations thereof. Communication links 318, 320, 322, 324, 326, 328 can comprise many different signals sharing the same link. Communication links 318, 320, 322, 324, 326, 328 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 302, 304, 306 and access node 308 could share the same representative wireless links 318, 320, 322, but be transferred over different communication sessions, frequencies, timeslots, packets, ports, sockets, logical transport links, or in different directions—including combinations thereof.

Access node 308 can be any network node configured to communicate with wireless devices 302, 304, 306 and communication network 312. Access node 310 can be any network node configured to communicate with wireless devices 302, 304, 306 and access node 308. While not illustrated in FIG. 3, access node 310 could also be in communication with communication network 312 in addition to being in communication with access node 308. Access nodes 308, 310 can be capable of providing wireless communications to wireless devices 302, 304, 306. For example, access nodes 308, 310 can be selected from a base transceiver station, a radio base station, an eNodeB device, or an enhanced eNodeB device.

Access node 308 can be associated with a first radio access technology and access node 310 can be associated with a second radio access technology different from the first radio access technology. For example, access node 308 can be associated with a wireless cellular protocol such as CDMA, GSM, WiMAX, LTE, and HSDPA and access node 310 can be associated with a local or short-range wireless protocol such as IEEE 802.11, WiFi, Bluetooth, Zigbee, and IrDA. Access node 310 can be a stand-alone device or it can be a multi-mode device where modes can include at least a cellular protocol and a local wireless protocol. For instance, when access node 310 is a wireless device having multi-mode functionality such that the wireless device can be enabled in a mobile hot spot, the wireless device can communicate with wireless devices 302, 304, 306 using a local wireless protocol. In addition, access node 310 can communicate with access node 308 over communication link 328 using a different protocol such as a wireless cellular protocol.

Access nodes 308, 310 can comprise a processor and associated circuitry to execute or direct the execution of computer-readable instructions to obtain information. Access nodes 308, 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 308, 310 can receive instructions and other input at a user interface.

Access node 308 can be in communication with communication network 312 through communication link 332. Access node 310 can be in communication with access node 308 through communication link 330. Communication links 330, 332 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 128, 130 can be a direct link or might include various equipment, intermediate components, systems, and networks. Links 330, 332 can include multiple signals operating in a single pathway in a similar manner as wireless links 318, 320, 322, 324, 326, 328.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 can be capable of carrying data, for example, to support voice and data communications by a wireless device such as wireless devices 302, 304, 306. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 can also comprise additional base stations, controller nodes, telephony switches, internet routers, network gateways, computer systems, communication links, or some other type of communication equipment, and combinations thereof.

Controller node 314 can be any element configured to communicate information over a network or to control communication of the information over the network. Controller node 314 can be in communication with communication network 312 through communication link 334. Controller node 314 can be a standalone computing device, computing system, or network component, and can be accessible, for example, by a wired or wireless connection, or through an indirect connection such as through a computer network or communication network. For example, controller node 314 can include a mobility management entity (MME), a serving gateway (SGW), a public data network gateway (PGW), etc.

Controller node 314 can comprise a processor and associated circuitry to execute or direct the execution of computer-readable instructions to obtain information. Controller node 314 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 314 can receive instructions and other input at a user interface.

Authorization node 316 can be any network element configured to perform various authorization functions in the network. For instance, authorization node 316 can perform network authorizations for a particular entity or activity, IP address filtering, address assignment, route assignment, quality of service or differential services, bandwidth control or traffic management, encryption, etc. Authorization node 316 can be in communication with controller node 314 through communication link 336. Authorization node 316 can be a standalone computing device or incorporated into one or more other network elements. For example, authorization node 316 can include a Home Subscriber Server (HSS), a Policy Control and Charging Rules Function (PCRF), an Authentication, Authorization, and Accounting node (AAA), etc.

Authorization node 316 can comprise a processor and associated circuitry to execute or direct the execution of computer-readable instructions to obtain information. Authorization node 316 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Authorization node 316 can receive instructions and other input at a user interface.

In operation, wireless devices 302, 304, 306 can establish communication links 318, 320, 322 with access node 308 using a first radio access technology, such as a cellular protocol. While wireless devices 302, 304, 306 are in active communication with access node 308, each wireless device 102, 104, 106 can monitor for access nodes capable of communicating using a second radio access technology such as a short-range wireless protocol. For instance, each wireless device 302, 304, 306 can monitor a predetermined geographic location surrounding the wireless device.

Each access node capable of communicating using a second radio access technology can send a broadcast message using the short-range protocol. The broadcast message can include information associated with the identity of the broadcasting access node such as a SSID and/or a MAC address. The wireless device can receive the broadcast message using the transceiver associated with the second radio access technology. A scanning report can be generated by the wireless device where the scanning report can include a unique identifier associated with the access node sending the broadcast message. The wireless device can receive broadcast messages from a plurality of access nodes.

Before sending the scanning report, the wireless device can determine whether each access node communicating using the second radio access technology within the predetermined geographic location meets a minimum communication link criteria. The minimum criteria can be based on various factors such as signal strength, signal-to-noise ratio, signal-to-interference plus noise ratio, carrier-to-interference plus noise ratio, received signal strength indicator, reference signal receive power, reference signal receive quality, etc. When an access node does not meet the minimum communication link criteria, the access node can be omitted from the scanning report.

When the access node communicating using the second radio access technology meets the minimum communication link criteria, it is included within the scanning report. The scanning report can include one or more access nodes. In addition, the scanning report can be sent immediately following detection of a broadcast message or the wireless device can save information associated with a broadcast message and send the scanning report at a predetermined time period such that a number of scanning reports are aggregated and sent together. The scanning report can be a separate message or it can be included with other messages such as reports of other data transmissions. Each wireless device 302, 304, 306 can send the scanning report to controller node 314 using the first radio access technology over communication links 318, 320, 322.

Controller node 314 can receive scanning reports from wireless devices 302, 304, 306. Further, controller node 314 can categorize the second access nodes based on various factors such as geographic location and communication link criteria. Categorization can include grouping the second access nodes common to a plurality of wireless devices based on location or link criteria. Each wireless device can be included in a plurality of groups and each group can include one or more second access nodes. The groups can be based on the unique identifier of the second access node.

Controller node 314 can determine which wireless devices in communication with access node 308 to transfer to a second access node and can select a second access node 310 from the plurality of second access nodes identified in all of the scanning reports. The determination of which wireless devices to transfer can be based on various factors such as network congestion associated with access node 308 and/or quality of service requirements associated with each wireless device. Quality of service requirements can be based on applications running on the wireless device. For example, quality of service requirements can include at least one of a traffic type (e.g. guaranteed bit rate and/or non-guaranteed bit rate), a data packet or traffic flow priority, a maximum permitted data delay (latency), a minimum throughput, a maximum data loss rate, jitter, and out-of-order delivery thresholds. In addition, determination of which wireless devices to transfer can be further based on factors associated with the wireless device such as battery power requirements and/or levels, etc.

After the controller node 314 determines which wireless devices can be transferred to the selected second access node, controller node 314 can send an activation message to the selected second access node 310. The message can be indicative of activation such that the second access node 310 is enabled to communicate with wireless devices using the second radio access technology. In an embodiment, the selected access node is currently operating using the second radio access technology. Alternatively, the selected access node can initiate communications using the second radio access technology after receiving the activation message from the controller node 314. For example, when the selected access node 310 is a multi-mode device such as a wireless device capable of becoming a wireless hotspot, the multi-mode device can activate the transceiver associated with the second radio access technology after receiving the activation message where the activation message triggers the hotspot to change from an idle mode to an active mode.

The activation message can include a list of the unique identifiers associated with the wireless devices selected to be transferred to the second access node such that wireless devices included in the list may gain communication access to the second access node. The unique identifier can be the WiFi MAC address of the selected wireless device and/or the scriber identification of the wireless device. The activation message can further include instructions regarding an active time period in which to expect a WiFi signal to become available. The second access node can modify the internal MAC filter based on the information included in the activation message.

The controller node 314 can send a transfer message to the wireless devices selected to communicate with the second access node 310. The transfer message can be a handover signal that indicates the selected second access node 310. Alternatively, the transfer message can be a handover signal that includes a plurality of second access nodes in which the selected wireless devices can initiate communications. The transfer message can include a handover execution time where the handover execution time can be immediate or within a predetermined time interval. In addition, the transfer message can include an indication of a predetermined duration in which each wireless device is in communication with the second access node.

After receive the transfer message, each wireless device can send a request to initiate communications with the second access node 310. The second access node 310 can verify that the wireless device that initiates the request is authorized to access the second access node 310. For example, the second access node 310 can compare the unique identifier of each wireless device with the list identifying the selected wireless devices sent by the controller node 314. When the wireless device is on the list allowing access, a communication link 324, 326, 328 using the second radio access technology can be established between the wireless devices 302, 304, 306 and the second access node 310 and communication links 318, 320, 322 using the first radio access technology are released. When the wireless device is not on the list, access node 310 can further determine whether or not to grant access to the wireless device based on a predetermined network policy.

After activation of the second access node, a bandwidth allocation of communication link 330 can be adjusted. Communication link 330 can use the first radio access technology. The bandwidth allocation can be adjusted based on various factors, such as quality of service factors. The quality of service factors can be related to applications running on the wireless devices. For example, quality of service factors can include at least one of a traffic type (e.g. guaranteed bit rate and/or non-guaranteed bit rate), a data packet or traffic flow priority, a maximum permitted data delay (latency), a minimum throughput, a maximum data loss rate, jitter, and out-of-order delivery.

Controller node 314 can send a request to modify bandwidth allocation of communication link 330 to authorization node 316. Authorization node 316 can modify quality of service factors associated with the connection with access node 310. Quality of service factors associated with access node 310 can be modified based on the previous quality of service requirements of the wireless devices when in communication with access node 308. This can allow for a transition from access node 308 to access node 310 to appear seamless to a user while continuing service at the same level. In addition, quality of service factors can be assigned to access node 310 based on the wireless device in communication with access node 310 that has the highest quality of service requirements. For example, the minimum guaranteed bit rate of the hotspot's connection may be modified to reflect the sum of the minimum bit rate of each wireless device connected to the access node 310. If bandwidth allocation cannot be adjusted to satisfy a wireless device's quality of service requirement, the wireless device can maintain its active communication session with access node 308 and not continue communications with access node 310.

The authorization node 316 can send a message to access node 308 to adjust the bandwidth allocation of communication link 330. After the bandwidth allocation is adjusted, the authorization node 316 can continuously monitor activity at access node 310. For example, the authorization node 316 can monitor the identity of wireless devices in communication with access node 310 and modify a list of the wireless devices as wireless devices are added or dropped from communication with access node 310. In addition, the authorization node 316 can monitor the application activity of the wireless devices in communication with access node 310 and modify any quality of service factors based on the wireless devices requirements accordingly. For example, bandwidth allocation can be readjusted when the number of wireless devices in communication with access node 310 changes or application requirements of the wireless devices change during the communication session.

If access node 310 becomes unavailable, wireless devices 302, 304, 306 can re-establish communications with access node 308. For example, controller node 310 can determine that access node 308 is no longer available to maintain communications with wireless devices 302, 304, 306. Controller node 310 can instruct wireless devices 302, 304, 306 to initiate communications with access node 308 using the first radio access technology.

Figure 4:
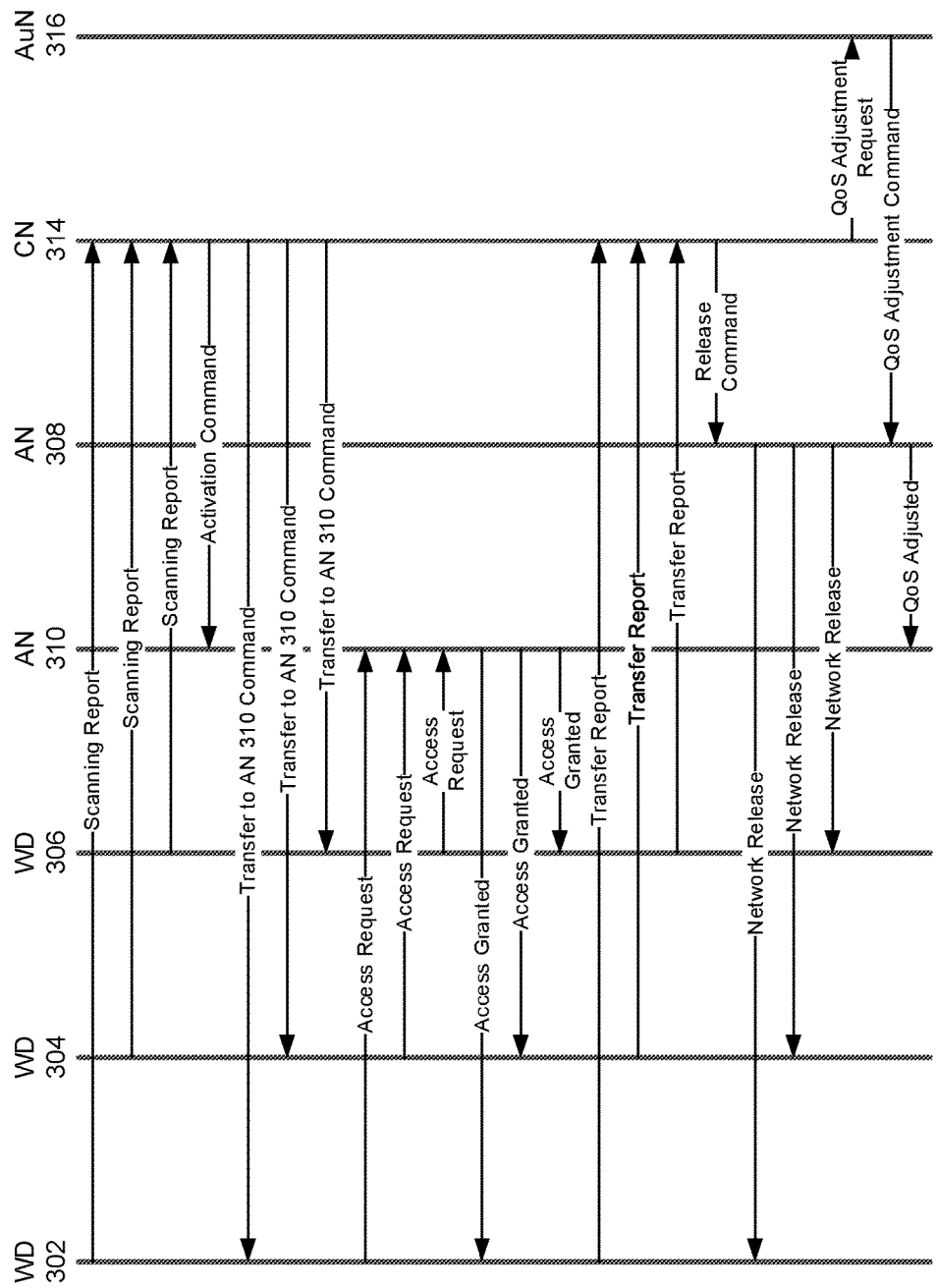
FIG. 4 is an exemplary signaling diagram that illustrates an exemplary method of providing wireless communication to a wireless device.

FIG. 4 is an exemplary signaling diagram that illustrates an exemplary method of providing wireless communication to a wireless device. The signal diagram will be discussed with reference to the exemplary communication system 300 illustrated in FIG. 3. However, the signaling diagram can be implemented with any suitable communication system. For example, a single network node can perform the signaling functions of controller node 314 and authorization node 316. In addition, although FIG. 4 depicts signaling performed in a particular order for purposes of illustration and discussion, the signaling discussed herein is not limited to any particular order. Moreover, additional signaling not included in FIG. 4 can also be performed.

Assume that wireless devices 302, 304, 306 are in communication with access node 308 using a first radio access technology such as a cellular protocol. For example, active communication sessions are established between wireless devices 302, 304, 306 and access node 308.

Each wireless device 302, 304, 306 can send a scanning report to controller node 314 when a second access node 310 operating using a second radio access technology, such as a short-range wireless protocol, is detected. The scanning report can include a unique identifier associated with the detected access node.

Controller node 314 can select a second access node 310 in which to transfer the wireless devices 302, 304, 306. The controller node 314 can send an activation command message to the selected access node 310 to initiate the handover of wireless devices 302, 304, 306 from access node 308. The activation command message can include a list of wireless devices that are granted access to access node 310. In addition, the controller node 314 can send a transfer command message to the wireless devices 302, 304, 306 identifying that access node 310 as the intended target during handover.

Wireless devices 302, 304, 306 can send an access request message to access node 310 requesting access to access node 310. Access node 310 can reply with access granted messages to the wireless devices 302, 304, 306 when the wireless devices are contained in the approve list sent from the controller node 314. After wireless devices 302, 304, 306 successfully initiate a communication session with access node 310 using the second radio access technology, wireless devices 302, 304, 306 can send a transfer report to the controller node 314 indicating that the handover was successful.

When controller node 314 receives the transfer reports from the wireless devices 302, 304, 306, controller node 314 can send a release command message to access node 308 indicating that active communication sessions using the first radio access technology are to be terminated. Access node 308 sends a network release message to the wireless devices 302, 304, 306 thereby terminating the active communication sessions with access node 308.

Controller node 314 sends a request to authorization node 316 to adjust the bandwidth allocation of the communication link between access node 308 and access node 310. For example, a quality of service adjustment message can be sent. In response, the authorization node 316 can send a quality of service adjustment command to access node 308 and the quality of service can be adjusted between access node 308 and access node 310.

Figure 5:
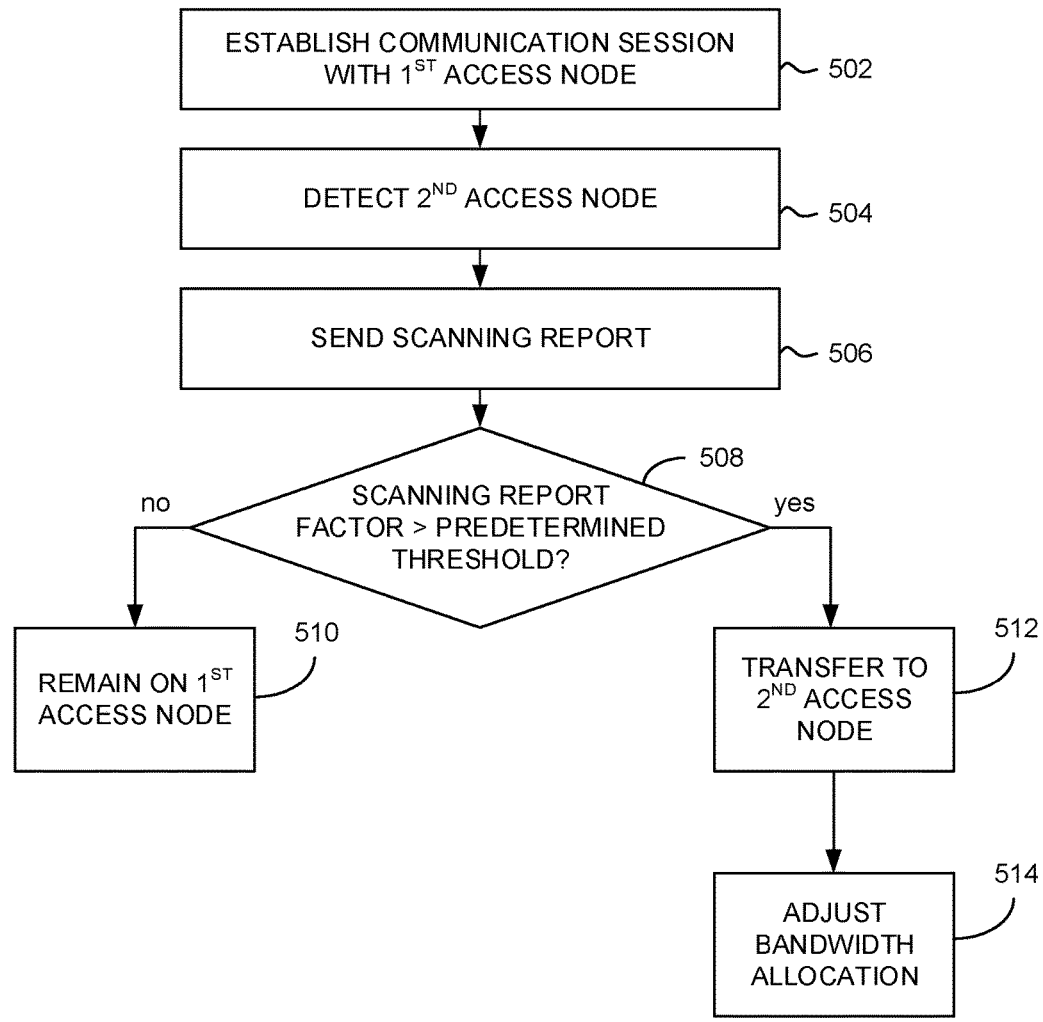
FIG. 5 illustrates another exemplary method of providing wireless communication to a wireless device.

FIG. 5 illustrates a flow chart of an exemplary method for providing wireless communication to a wireless device. The method will be discussed with reference to the exemplary communication system 300 illustrated in FIG. 3. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A wireless device can establish a communication session with a first access node at 502. For example, wireless devices 302, 304, 306 can establish a communication with access node 308 using a first radio access technology. While the wireless devices are in communication with a first access node, a second access node can be detected by the wireless devices at 504 where the second access node uses a second radio access technology.

Each wireless device can send a scanning report at 506. For example, wireless devices 302, 304, 306 can send a scanning report to controller node 312. The scanning report can include scanning report factors. Scanning report factors can include a signal strength value, a signal-to-noise ratio value, a signal-to-interference plus noise radio value, a carrier-to-interference plus noise ratio value, a received signal strength indicator value, a reference signal receive power value, and a reference signal receive quality value, etc.

At least one scanning report factor can be compared to a predetermined threshold at 508. For example, the controller node 312 can compare at least one scanning report factor to the predetermined threshold to determine whether signal conditions are better over the communication links with access node 308 or access node 310. When the scanning report factors are less than the predetermined threshold, the wireless devices 302, 304, 306 remain in communication with a first access node at 510.

When the scanning report factors are greater than the predetermined threshold, wireless devices 302, 304, 306 can transfer to a second access node at 512 where the second access node communicates with wireless devices 302, 304, 306 using a second radio access technology. In addition, the bandwidth allocation of the communication link between the first access node and the second access node is adjusted at 514.

Figure 6:
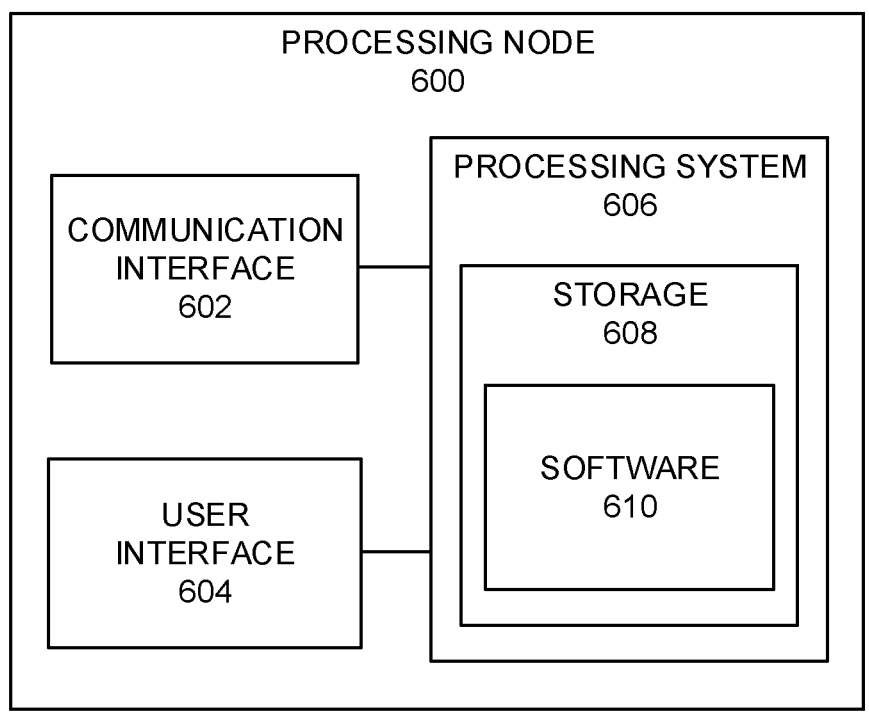
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of providing wireless communications in a communication network. Processing system 606 includes storage 608, which can comprise a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 108, 110, 308, 310, controller nodes 114, 314, and authorization node 316. Processing node 600 can also be an adjunct or component of a network element, such as an element of access nodes 108, 110, 308, 310, controller nodes 114, 314, and authorization node 316. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:
1. A method of providing wireless communication to a wireless device, comprising:

receiving, at a controller node, scanning reports from one or more wireless devices in communication with a first access node using a first radio access technology, each scanning report including a list of second access nodes capable of using a second radio access technology different from the first radio access technology;

selecting, from the lists of second access nodes, at least one second access node common to the one or more wireless devices;

sending, to the first access node via the controller node, an activation signal comprising a list of wireless devices authorized to access the at least one second access node;

receiving, at the first access node via the controller node, an instruction to establish a first communication link with the at least one second access node using the first radio access technology;

receiving, at the first access node, a request from the one or more wireless devices to establish a second communication link with the at least one second access node using the second radio access technology; and establishing, at the second access node, the second communication link with at least one wireless device of the one or more wireless devices when the at least one wireless device is included in the authorized list of wireless devices.

2. The method of claim 1, further comprising:
receiving a bandwidth allocation adjustment command for the first communication link based on a bandwidth criteria.

3. The method of claim 2, wherein the bandwidth criteria comprises at least one of an application requirement, a maximum error rate requirement, and a maximum latency requirement.

4. The method of claim 2, further comprising:
receiving a bandwidth allocation adjustment command of the first communication link based on a bandwidth criteria of the one or more wireless devices.

5. The method of claim 2, wherein the first radio access technology comprises a cellular protocol and the second radio access technology comprises a short-range wireless protocol.

6. A system of providing wireless communication to a wireless device, the system comprising:
a processing node configured to:
receive scanning reports from one or more wireless devices in communication with a first access node using a first radio access technology, each scanning report including a list of second access nodes capable of using a second radio access technology different from the first radio access technology;

select, from the lists of second access nodes, at least one second access node common to the one or more wireless devices;

send, to the first access node, an activation signal comprising a list of wireless devices authorized to access the at least one second access node;

receive, at the first access node, an instruction to establish a first communication link with the at least one second access node using the first radio access technology;

receive, at the first access node, a request from the one or more wireless devices to establish a second communication link with the at least one second access node using the second radio access technology; and establish, at the second access node, the second communication link with at least one wireless device of the one or more wireless devices when the at least one wireless device is included in the authorized list of wireless devices.

7. The system of claim 6, the processing node further configured to:
receive a bandwidth allocation adjustment command for the first communication link based on a bandwidth criteria.

8. The system of claim 6, wherein the bandwidth criteria comprises at least one of an application requirement, a maximum error rate requirement, and a maximum latency requirement.

9. The system of claim 7, a processing node further configured to:
receive a bandwidth allocation adjustment command of the first communication link based on a bandwidth criteria of the one or more wireless devices.

10. The system of claim 7, wherein the first radio access technology comprises a cellular protocol and the second radio access technology comprises a short-range wireless protocol.

11. A method of providing wireless communication to a wireless device, comprising:
receiving, at a first access node using a first protocol, scanning reports from a plurality of wireless devices in communication with the first access node, the scanning reports including at least one second access node common to the plurality of wireless devices, wherein the second access node uses a second protocol;

selecting at least one wireless device from the plurality of wireless devices for handover from the first access node to the second access node;

sending a message that includes a unique identifier associated with the selected wireless device to the second access node; and authorizing handover of the wireless device from the first access node to the second access node when an authorized list of wireless devices includes the unique identifier.

12. The method of claim 11, wherein the unique identifier is a WiFi MAC address of the selected wireless device.

13. The method of claim 12, wherein the message further includes instructions of an active time period during which a WiFi signal of the selected wireless device is available.

14. The method of claim 11, further comprising:
establishing, at the second access node, a communication link with the selected wireless device when the selected wireless device is included in the authorized list of wireless devices allowed to access the second access node.

15. The method of claim 14, further comprising:
receiving a bandwidth allocation adjustment command for the communication link based on a bandwidth criteria.

16. The method of claim 15, wherein the bandwidth criteria comprises at least one of an application requirement, a maximum error rate requirement, and a maximum latency requirement.

17. The method of claim 11, wherein the first protocol comprises a cellular protocol and the second protocol comprises a short-range wireless protocol.

* * * * *